United States Patent [19]

Stevens et al.

[11] 4,326,048

[45] Apr. 20, 1982

[54] METHOD FOR EMERGENCY SHUTDOWN OF GAS PHASE POLYOLEFIN REACTOR

[75] Inventors: Jack F. Stevens, Naperville; Kwok-fu Lee, Glen Ellyn; Philip M. Rose, Naperville; David R. Kreider; Chi-Hung Lin, both of Wheaton, all of Ill.

[73] Assignee: Standard Oil Company (Indiana), Chicago, Ill.

[21] Appl. No.: 153,773

[22] Filed: May 27, 1980

[51] Int. Cl.$^3$ ............... C08F 2/34; C08F 2/42; C08F 10/06

[52] U.S. Cl. ................ 526/68; 526/84; 526/351; 528/483; 528/490

[58] Field of Search ............ 526/84, 68; 528/483, 528/490

[56] References Cited

U.S. PATENT DOCUMENTS

| | | | |
|---|---|---|---|
| 2,910,461 | 10/1959 | Nowlin et al. | 526/177 |
| 3,269,997 | 8/1966 | Lyons et al. | 528/489 |
| 3,700,710 | 10/1972 | Mottus | 528/483 X |
| 3,708,465 | 1/1973 | Dietrich | 526/84 |
| 4,130,699 | 12/1978 | Hoff | 526/84 X |

FOREIGN PATENT DOCUMENTS 79300292.4 10/1979 European Pat. Off. .

OTHER PUBLICATIONS

Raff & Doak, "Crystalline Olefin Polymers," Interscience Pubs., p. 371.
Vesely et al., Journal of Polymer Science, vol. 55, pp. 22–32, (1961).
Zakharov et al., Die Makromolekulare Chemie, vol. 175, pp. 3035–3040, (1974).
Mejzlik et al., Die Makromolekulare Chemie, vol. 178, pp. 261–266, (1977).

*Primary Examiner*—C. A. Henderson
*Attorney, Agent, or Firm*—Wallace L. Oliver; William T. McClain; William H. Magidson

[57] ABSTRACT

In a gas phase olefin polymerization using a transition metal compound/aluminum alkyl catalyst system, polymerization can be terminated rapidly by injecting an amount of carbon oxide and then restarting efficiently by addition of an amount of aluminum alkyl.

5 Claims, No Drawings

METHOD FOR EMERGENCY SHUTDOWN OF GAS PHASE POLYOLEFIN REACTOR

BACKGROUND OF THE INVENTION

This invention relates to terminating a gas-phase olefin polymerization reaction using a Ziegler-Natta catalyst system.

Olefin polymerizations using Ziegler-Natta catalyst systems are well known in the art. Recently, olefin polymerization in the gas phase has become commercially significant. In gas phase polymerization processes there is a need for a method to terminate the polymerization reaction rapidly and effectively in an emergency situation, while providing a method to restart polymerization without serious difficulty.

Polymerization of olefins, such as propylene or ethylene, in slurry or bulk phase processes can be terminated by addition of substances such as alcohols, ketones, ethers, aldehydes, carboxylic acids, phenols, water, oxygen, and carbon oxides. However, the effectiveness of such substances in gas-phase polymerizations is not predictable because the contact between a catalyst and a catalyst termination agent in a gas phase reactor generally is not as good as in a liquid phase reactor and especially the ability to restart a polymerization reaction after deactivation is uncertain.

It was found that isopropanol was successful in terminating a gas phase propylene polymerization, however it is difficult to mix uniformly a small volume of liquid isopropanol with a bed of polymer. Further, it was found that catalyst killed with isopropanol cannot be restored to a satisfactory fraction of original activity by any known method.

In a gas phase polymerization system, it is vital to terminate the reaction in an emergency shutdown condition with the ability to restart polymerization efficiently. If polymerization is terminated by a method such as use of isopropanol which permanently stops growth of polymer around a catalyst particle, the entire inventory of polymer in the reactor might need be replaced before restarting polymerization which would represent a time-consuming and costly operation.

We have discovered a method to terminate a gas phase olefin polymerization reaction while maintaining the ability to restart the reaction.

SUMMARY OF THE INVENTION

A method to terminate and then restart a gas phase olefin polymerization reaction using a titanium halide/aluminum alkyl catalyst system comprises (1) discontinuing catalyst addition, reactor quench liquid flow and reactor off gas flow, (2) injecting an amount of carbon oxide sufficient to terminate the reaction, (3) discontinuing recycle gas flow, (4) venting and flushing polymerization reactor, (5) resuming quench liquid, off gas and recycle gas flow, (6) injecting an amount of aluminum alkyl sufficient to initiate polymerization, and (7) resuming titanium halide addition.

BRIEF DESCRIPTION OF THE INVENTION

The present invention comprises a method of terminating a gas phase olefin polymerization reaction which can be restarted by addition of excess aluminum alkyl.

Olefins useful in this invention include ethylene, propylene and mixtures of ethylene, propylene and other copolymerizable alpha-olefins, such as mixtures of ethylene and propylene, ethylene and 1-butene, and propylene and 1-butene. Preferably this invention is useful in polymerization of propylene and mixtures of propylene and minor amounts of copolymerizable alpha-olefins including ethylene. The most preferable olefin is propylene.

The catalyst useful in the gas phase olefin polymerization system in which this invention is suitable contains (a) an organoaluminum compound and (b) a transition metal compound.

Useful organoaluminum compounds include trialkylaluminum, dialkylaluminum halides, mixtures of trialkylaluminum with dialkylaluminum halides and mixtures of trialkylaluminum with alkylaluminum dihalides. Also catalytic effective amounts of mixtures of trialkylaluminum and dialkylaluminum halides can be used in conjunction with alkylaluminum dihalides. Useful halides include bromides and chlorides and useful alkyl radicals contain from two to about six carbon atoms. The preferable halide is chloride and the preferable alkyl radical is ethyl. Diethylaluminum chloride (DEAC) is most preferable in propylene polymerizations. In a trialkylaluminum-dialkylaluminum halide mixture, the preferred amount of trialkylaluminum is about 20 to 50 mol percent. In a trialkylaluminum-alkylaluminum dihalide mixture, the preferred amount of trialkylaluminum is about 30 to 70 mol percent and most preferably about 40 to 60 mol percent.

The transition metal compounds useful as a component in the catalyst system of this invention are compounds of transition metals of Groups IVB, VB and VIB of the Periodic Table. Preferably, the transition metal compound is a halide of titanium, vanadium, chromium or zirconium. Most preferably, titanium trichloride and especially activated titanium trichloride is used for propylene polymerizations. Titanium trichloride can be activated to a high degree of polymerization activity by chemical and physical means. One activated titanium trichloride has an approximate stoichiometric formula of $TiCl_3 \cdot 1/3\ AlCl_3$ and has been comminuted. Further, titanium trichloride can be activated by forming adducts with Lewis bases such as ethers or by supporting the titanium trichloride on a catalytically inert substance such as a metal oxide or salt. One suitable titanium trichloride is described in U.S. Pat. No. 3,984,350 incorporated by reference herein.

Other suitable transition metal compounds are halides, oxyhalides, alkyloxyhalides, aryloxyhalides, alkoxides, or aryloxides of a Group IVB or VB transition metal, preferably vanadium or zirconium, and most preferably titanium. Preferable compounds for ethylene polymerization include titanium tetrachloride, titanium tetrabromide, butoxytitanium trichloride, dibutoxytitanium dichloride, tetrabutyl titanate, vanadium tetrachloride and zirconium tetrachloride.

The molar ratio of transition metal halide to organoaluminum compound in a catalyst system can range from about one-tenth to about 10, typically is about 1 to 3 preferably is about 2. The amount of catalyst in a polymerization depends on the reactor size and type and on the amount and type of olefin monomer and is known to the skilled artisan.

Catalyst additives can be added in minor amounts as disclosed in U.S. Pat. Nos. 3,950,268 and 4,072,809 incorporated herein by reference.

The gas phase reactor systems in which this invention is useful include both stirred bed reactors and fluidized bed reactor systems. Examples of such reactor systems are described in U.S. Pat. Nos. 3,957,448, 3,965,083, 3,971,768, 3,970,611, 4,129,701, 4,101,289, 3,652,527, and 4,003,712 all incorporated by reference herein.

The gas phase olefin polymerization reactor systems in which the present invention is useful comprise a reactor vessel to which olefin monomer and catalyst components can be added and which contain a bed of forming polymer particles. Typically, catalyst components are added together or separately through one or more valve-controlled ports in the reactor vessel. Olefin monomer, typically, is provided to the reactor through a recycle gas system in which unreacted monomer removed as off gas and fresh feed monomer are mixed and injected into the reactor vessel.

A quench liquid can be added to polymerizing olefin in order to control temperature. In propylene polymerization, the quench liquid can be liquid propylene. In other olefin polymerization reactions, quench liquid can be a liquid hydrocarbon such as propane, butane, pentane or hexane, and preferably is isobutane or isopentane. Depending on the specific reactor system used, quench liquid can be injected into the reactor vessel above or within the bed of polymer particles.

Generally, in this invention, carbon oxide is injected into a gas phase polymerization reactor in order to terminate polymerization in an emergency shutdown. Typically, the procedure is (1) discontinue catalyst addition, (2) discontinue reactor quench liquid (if any), (3) discontinue flow of reactor off gas, (4) inject an amount of carbon oxide into reactor, (5) discontinue flow of recycle gas, and (6) vent reactor. The sequence of these steps may be altered. Preferably, the bed of polymer particles in the reactor vessel is agitated during this termination procedure, although agitation is not necessary.

In the event of a power failure in which agitation stops, the reaction termination method described herein is effective. Preferably the carbon oxide is injected in the bottom of the reactor vessel, below the level of the polymer bed.

Carbon oxides useful in this invention include carbon dioxide and carbon monoxide. Carbon dioxide is preferred.

An important advantage of this invention is the ability to restart polymerization activity after termination of reaction. In order to revive polymerization the addition of carbon oxide should be stopped. Preferably, residual carbon oxide is vented and flushed from the reactor one or more times with a suitable gas such as nitrogen or hydrogen. With agitation, reactor off gas, recycle liquid and recycle gas systems are activated. Aluminum alkyl is injected into the reactor. Titanium halide component injection is resumed, preferably when catalyst activity in the polymer bed is partially restored. It has been found that polymerization activity usually can be restored fully within 1-2 hours after addition of catalyst although product color may be affected for some time after that.

The amount of carbon oxide required to terminate polymerization effectively depends on the olefin used, the polymerization reaction conditions and agitation speed. Generally, with agitation a carbon oxide/$TiCl_3$ molar ratio of about 50 will terminate a propylene polymerization within about four minutes, while without agitation a carbon oxide/$TiCl_3$ molar ratio of about 110 is sufficient to stop polymerization within three minutes. If intraparticle transport of carbon oxide in the polymer is the rate determining step in the reaction termination process, the required carbon oxide dosage can be specified as a partial pressure. In such case carbon oxide partial pressures of about 5 psi for an agitated bed and of about 20 psi for a stationary bed have been found sufficient. The optimum amount of carbon oxide useful in a particular reactor system can be determined easily by routine experimentation.

The amount of aluminum alkyl required to restart polymerization typically is substantially larger than that present in the reactor bed before carbon oxide addition. Although optimum qualities of aluminum alkyl sufficient to restart polymerization can be easily determined by routine experimentation, it has been found that typically about 0.5 gram-mole to about 80 gram-mole of DEAC for each gram-mole of titanium halide present in the reactor is sufficient.

The following Examples demonstrate but do not limit this invention.

EXAMPLES I-VI

A series of propylene polymerization experiments was performed to demonstrate the present invention in a gas phase reactor system similar to that described in U.S. Pat. No. 3,965,083. A cylindrical reactor vessel of approximately 8 inches in diameter and 24 inches in length was equipped with three recycle gas nozzles spaced equidistantly along the bottom of the reactor and three liquid quench nozzles spaced equidistantly along the top of the reactor. The reactor is equipped with an off gas port for recycling reactor gas through a condenser and back through a recycle gas line to the recycle gas nozzles in the reactor. A carbon dioxide injection line was attached to the recycle gas line.

During reactor operation polypropylene powder was produced in the reactor bed, flowed over a weir, and discharged through a powder discharge system into a secondary closed vessel blanketed with nitrogen. Powder was removed from the secondary vessel and deactivated with water vapor. Polymerization temperature and pressure were maintained at 160° F. and 300 psig respectively with a production rate of about 4 pounds per hour.

Chemically activated titanium trichloride obtained from Solvay and Cie and diethylaluminum chloride in hexane solution were introduced into the reactor as catalyst components as two streams.

The procedure used in demonstrating the present invention was to (1) terminate catalyst component additions, (2) terminate reactor quench liquid, (3) close valve in reactor off gas line, (4) inject $CO_2$ into reactor along with recycle gas, and (5) shut off recycle gas. The results are shown in Table I.

To restore polymerization activity after termination with $CO_2$, the reactor was vented to about 5 psig, twice pressured with hydrogen or nitrogen to about 50 and vented to about 5 psig, and then repressured with propylene to about 275 psig by opening a block valve on the off gas line. With agitation operating, recycle gas and liquid were restored. Diethylaluminum chloride in hexane was fed into the reactor to restart polymerization. When steady polymer production rate was achieved, titanium trichloride introduction was resumed. The results of restarting polymerization are summarized in Tables II and III.

TABLE I

|  | Ex.I | Ex.II | Ex.III | Run A | Ex.IV |
| --- | --- | --- | --- | --- | --- |
| $CO_2$ dosage (g-moles) | 0.32 | 0.32 | 0.6 | 0.32 | 1.26 |

TABLE I-continued

|  | Ex.I | Ex.II | Ex.III | Run A | Ex.IV |
|---|---|---|---|---|---|
| $CO_2$ partial pressure | 5.0 | 5.0 | 2.5 | 5.0 | 20.0 |
| $CO_2$/DEAC mole ratio | 6 | 15 | 17 | 34 | 52 |
| $CO_2$/$TiCl_3$ mole ratio | 60 | 50 | 26 | 52 | 106 |
| Agitator speed (rpm) | 35 | 45 | 45 | 0 | 0 |
| Time to stop reaction (min.) | 2 | 2 | 2 | Fail | 3 |
| Maximum rise of average reactor temperature (°F.) | 9 | 12 | 12 | — | 3 |
| Maximum rise of reactor pressure (psi) | 5 | 15 | 15 | — | 20 |

TABLE II

Restart of Example I

| Remarks | Time (min.) | Liquid Quench Rate[1] (lbs./hr.) |
|---|---|---|
| Before $CO_2$ addition | — | 27.3 |
| $CO_2$ added | — | 0 |
| Add 0.075 g. mole--DEAC | 0 | 0 |
|  | 5 | 17.9 |
|  | 10 | 15.8 |
| Add 0.075 g. mole--DEAC | 15 |  |
|  | 20 | 11.5 |
|  | 25 | 15.8 |
| Add 0.075 g. mole--DEAC | 30 |  |
|  | 35 | 11.5 |
|  | 40 | 10.8 |
| Add 0.0075 g. mole--DEAC | 45 | 15.8 |
|  | 50 | 15.8 |
|  | 55 | 15.8 |
|  | 60 | 14.4 |
|  | 65 | 15.8 |
|  | 75 | 15.8 |
| $TiCl_3$ addition resumed | 175 | 21.5 |
|  | 235 | 28.0 |

[1]Amount of quench liquid required to stabilize polymerization reaction.

TABLE III

Restart of Example III

| Remarks | Time (min.) | Liquid Quench Rate[1] (lbs./hr.) |
|---|---|---|
| Before $CO_2$ addition | — | 28.0 |
| $CO_2$ added | — | 0 |
| Reactor repressurized | −7 | 0 |
|  | −4 | 3.6 |
|  | −2 | 3.6 |
| Add 0.001 g-mole--DEAC | 0 |  |
| Add 0.001 g-mole--DEAC | 5 | 14.4 |
|  | 8 | 20.1 |
| Add 0.001 g-mole--DEAC | 10 |  |
|  | 12 | 17.9 |
| Add 0.001 g-mole--DEAC | 15 |  |
|  | 16 | 14.4 |
|  | 20 | 15.8 |
|  | 25 | 15.8 |
|  | 42 | 16.5 |
|  | 50 | 17.2 |
| $TiCl_3$ addition resumed | 57 | 16.5 |
|  | 94 | 21.5 |
|  | 136 | 23.0 |
|  | 166 | 27.3 |
|  | 216 | 28.7 |
|  | 225 | 28.0 |

[1]Amount of quench liquid required to stabilize polymerization reaction.

TABLE IV

| Proportion | Control | Ex. V | Ex. VI | Run B |
|---|---|---|---|---|
| Melt Flow Rate (g./10 min.) | 4.2 | 4.3 | 2.9 | 7.6 |
| Heat Distortion Temp. (°F.) | 198 | 209 | 213 | 229 |
| Flexural Modulus (psi) | 168,000 | 161,000 | 234,000 | 205,000 |
| Tensile Impact (ft.-lb./in.$^2$) | 41.4 | 47.2 | 31.4 | 24.2 |
| Yellowness Index | 7.27 | 15.8 | 9.55 | 18.6 |
| Relative Brightness | 70.6 | 64.6 | 68.1 | 66.3 |

As can be seen from Table I in Examples I, II, III, and IV injection of carbon dioxide terminated polymerization within three minutes. Run A shown in Table I demonstrates an experiment wherein insufficient carbon dioxide was used.

Tables II and III show data confirming that polymerization can be restarted efficiently after termination with carbon dioxide.

Table IV compares product properties after termination. The Control sample was polypropylene formed without addition of a reaction termination agent. Example V is polypropylene gas phase product in which catalyst had been deactivated with carbon dioxide and then reactivated with DEAC. Example VI is polypropylene gas phase product in which catalyst had been deactivated with carbon dioxide. Run B is product from a gas phase polymerization terminated with isopropanol.

What is claimed is:

1. A method of rapidly terminating and restarting a gas phase olefin polymerization reaction using a titanium halide/aluminum alkyl catalyst system comprising (1) discontinuing catalyst addition, (2) discontinuing reactor quench liquid flow, (3) discontinuing reactor off gas flow, (4) injecting an amount of carbon oxide sufficient to terminate the reaction, (5) discontinuing recycle gas flow, (6) venting and flushing polymerization reactor, (7) resuming quench liquid, off gas and recycle gas flow, (8) injecting an amount of aluminum alkyl sufficient to initiate polymerization and (9) resuming titanium halide addition.

2. The method of claim 1 wherein the olefin is propylene or propylene together with a minor amount of a copolymerizable alpha-olefin.

3. The method of claim 1 wherein the carbon oxide is carbon dioxide.

4. The method of claim 2 wherein the alkyl aluminum is diethyl aluminum chloride.

5. The method of claim 3 wherein the olefin is propylene.

* * * * *